UNITED STATES PATENT OFFICE.

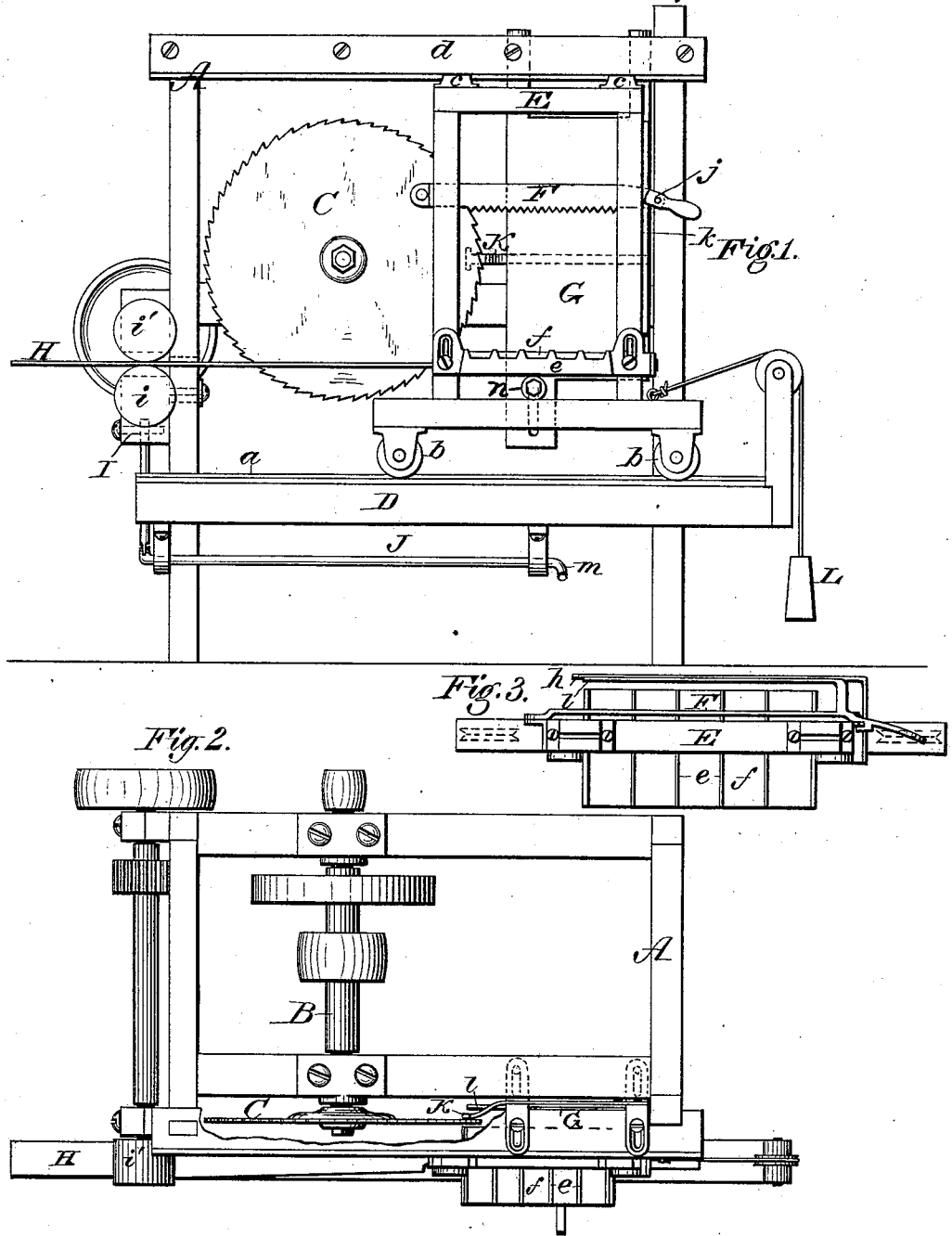

JOHN DU BOIS, OF WILLIAMSPORT, PENNSYLVANIA.

IMPROVEMENT IN MACHINES FOR SAWING BOX-STUFF.

Specification forming part of Letters Patent No. 215,897, dated May 27, 1879; application filed March 15, 1879.

*To all whom it may concern:*

Be it known that I, JOHN DU BOIS, of Williamsport, in the county of Lycoming and State of Pennsylvania, have invented certain Improvements in Machinery for Sawing Box Material, &c., of which the following is a specification.

My invention relates to machinery for utilizing slabs or sections of slabs and other pieces of lumber which have hitherto been regarded as waste material by converting them into thin even boards or strips suitable for box material and like purposes; and it consists in a traveling carriage supporting both sides of the slab or block, and arranged to present the same to the saw; in a peculiar arrangement of devices for advancing and returning the carriage; in a stop or arm to remove the finished board or strip from the carriage; and in certain details of construction hereinafter set forth.

Figure 1 represents a side elevation, and Fig. 2 a top-plan view, of my improved apparatus; Fig. 3, a plan view of the carriage.

A represents a strong frame, of suitable material, in which is mounted a transverse horizontal arbor, B, carrying at one end a circular saw, C. Extending along the forward side of the frame is a horizontal beam or support, D, furnished on its upper face with a rail or rib, $a$, to receive and guide the rollers $b$ of a carriage, E, which serves to advance the pieces to the saw.

The carriage E consists of a vertical frame supported upon the track or rail $a$, as described, and sustained and guided at its upper end by grooved or slotted blocks $c$ clasping the edge of a metal guide plate or rib, $d$, secured to the frame A parallel with the track $a$. Secured in the frame E, at a suitable distance below the center of the saw C, is a bed or support consisting of a ribbed metal plate, $e$, having the spaces between its ribs filled nearly to the upper faces of the same with wooden strips or slats $f$, as shown in Fig. 1, this bed being so located as to pass just in front of the face of the saw C when advanced, while an arm, $h$, secured to the bed projects a short distance directly backward therefrom, and, then bending off at a right angle, extends in a horizontal position, parallel with the same, to the forward end of the bed, as shown in Fig. 3, said arm passing behind the saw when the carriage is advanced. The bed and its arm $h$ thus arranged give to the slab or block at its lower end a support on both sides of the saw, the slab or block being firmly seated upon the ribs of the bed and the upper edge of the arm $h$. The upper end of the slab or block is also supported on both sides of the saw by means of a toothed or notched bar or lever, F, pivoted to the frame E, and having a rear arm, $l$, similar to the arm $h$.

It will be seen that by this arrangement the slice or board cut from the slab or block is firmly held and supported during the operation of sawing, thereby insuring much smoother and more even work.

The lever or bar F is furnished at its free end with a lip, $j$, engaging over a strip or guide-plate, K, on the carriage, to prevent side play or vibration.

The lever may be furnished with locking devices to hold it firmly upon the block or slab, or it may be simply held thereon by hand.

For the purpose of regulating the thickness of the slices or boards cut off by the saw, an upright bed or plate, G, is adjustably secured to the frame A, directly behind the carriage, when the latter is drawn back away from the saw. By setting the face of the bed or plate nearer to or farther from the carriage, the distance to which the face of the block may be projected past the saw is regulated and the thickness of the board or slice controlled.

Adjustably secured to the face of the bed or plate G is a flanged supporting-roller, which serves to guide and support the arm $h$.

For the purpose of advancing the carriage E, I attach to its forward side a thin strip, H, which is carried forward and passed between two friction-rolls, $i$ $i'$, the lower of which is mounted upon a shaft carried in a sliding box at the forward side of the frame at one end, and at its rear end gearing with the shaft of the upper roll. The sliding box I is connected with a rock-shaft, J, having its end carried to a convenient point for the operator and furnished with a treadle, $m$. By pressing the treadle downward with his foot the operator may force upward the roller $i$, and thus cause the strip or plate H to be firmly pressed on opposite sides between the rolls, which, being rotated in the proper direction through connection with the driving-power, cause the strip or bar to be drawn forward and advance the carriage E. Pressure being removed from the treadle m, the roller i is permitted to fall, and the carriage is drawn back by means of a weight, L, secured to one end of a cord or chain passing over a pulley and attached at its opposite end to the carriage, as shown.

In order to remove the slice or board from the carriage or from the arms h l, after it is cut from the block or slab, a spring-arm, K, is secured to the rear of face the supporting-plate G, and extends forward to a point slightly within the circumference of the saw, as shown in Figs. 1 and 2, the end of said arm being bent or curved inward toward the face of the saw, and arranged to engage with the rear edge of the board or slice and prevent its return with the carriage, the pieces falling down as the carriage moves backward.

Under the above construction the operator has merely to clamp or fasten the slab or piece in the carriage and throw the feed-rolls into action by means of the treadle or foot-lever, whereupon the carriage is advanced, the slice cut from the block or slab and discharged from the carriage, when, by removing the pressure of his foot, the rolls are thrown out of action, and the carriage is returned to its first position by the weight L.

In order that blocks, bolts, or slabs of different lengths shall all be presented centrally to the saw, the bed e, with its arm h, and the flanged roller n, which sustains said arm, are made adjustable vertically, as represented in Fig. 1.

It is obvious that any other feed mechanism may be employed, that the bar F may be arranged to slide on the carriage instead of being pivoted, and that other modifications of the details may be made.

Having thus described my invention, what I claim is—

1. The combination of the main frame provided with the upright saw, the support G, and arm K, the sliding frame or carriage E, provided with the supports e and F, and the feed mechanism arranged to be thrown into and out of action at the will of the attendant.

2. In combination with an upright saw and upright sliding carriage, an arm, K, arranged as shown, to cause the automatic delivery of each board or piece during the retreat of the carriage.

3. In combination with the saw and the supporting-plate G, adapted to be adjusted and held in a fixed position, the sliding carriage provided with the lower support, e, and upper movable dog or arm, F, both arranged to straddle the saw, in the manner shown.

4. In combination with the vertical saw and the sliding carriage provided with the supporting devices straddling the saw, the adjustable support G.

5. The combination of the saw, the sliding upright carriage, the weight to return the carriage, and the feed mechanism connected with the foot-lever, whereby the attendant is enabled to handle the bolt or block and control the feed at the same time.

JOHN DU BOIS.

Witnesses:
WALTER S. DODGE,
WILLIAM W. DODGE.